United States Patent Office 3,595,855
Patented July 27, 1971

3,595,855
PROCESS FOR PRODUCING AMINOPENICILLINS
Charles A. Robinson, West Chester, Pa., assignor to American Home Products Corporation, New York, N.Y.
No Drawing. Filed Dec. 5, 1968, Ser. No. 781,582
Int. Cl. C07d 99/16
U.S. Cl. 260—239.1     3 Claims

ABSTRACT OF THE DISCLOSURE

A process for preparing aminopenicillins in high yield wherein 6-aminopenicillanic acid is silylated with the use of hexamethyldisilazane in methylene chloride at reflux temperature to give monosilylated 6-aminopenicillanic acid. The reaction mixture is then treated with a weak amine followed by reaction with a suitable organic acid halide hydrohalide. Solvolysis with water or an alcohol is then employed to remove the silyl group thereby to afford a solution of the aminopenicillin hydrohalide, which is then isolated as the aminopenicillin.

---

The present invention relates generally to the production of aminopenicillins, and more particularly, to a process for preparing said penicillins from 6-aminopenicillanic acid (6-APA) by the silyl route utilizing hexamethyldisilazane as silylating agent and the monosilyl derivative of the penicillin as an intermediate.

The use of hexamethyldisilazane for the silylation of 6-aminopenicillanic acid (6-APA) has been described by Glombitza, Annalen, 673, 166 (1964) and disclosed in U.S. Pat. 3,349,622 and Irish Pat No. 7,463.

In the Glombitza procedure, 6-APA is heated with excess hexamethyldisilazane (2 moles per mole of 6-APA) in chloroform at reflux for ¾ to 1¼ hours. Removal of solvent by distillation and high vacuum drying affords monosilylated 6-APA containing 10–15% disilylated 6-APA. For the preparation of penicillins (nonamino), the silylated 6-APA is dissolved in a mixture of chloroform and dioxane and is acylated with organic acid chlorides in the presence of triethylamine.

In the U.S. Pat. 3,249,622, 6-APA is reacted with a disilazane in the presence of an inert solvent of the group consisting of aliphatic hydrocarbons, aromatic hydrocarbons and cyclic ethers, or preferably in the presence of the disilazane as solvent. The process is exemplified (Example 6 in the patent by heating 6-APA and hexamethyldisilazane as solvent at 80° C. for 4–5 hours, then at 120° C. for ½ hour, and distilling off excess hexamethyldisilazane under vacuum. The residue, found to be predominantly disilylated 6-APA, is dissolved in tetrahydrofuran and acylated in the presence of triethylamine. In Example 12 of the patent, the reactants are refluxed in benzene in the proportions theoretically required for monosilylation until no more ammonia is evolved, and the resulting mixture is acylated. However, in repeating the procedure of Example 12, a large proportion of unreacted 6-APA remained even after a six hour reflux. Moreover, the process is not applied to the preparation of aminopenicillins in any case.

In Irish Pat. No. 7,463, 6-APA is heated with an excess of a hexaalkyldisilazane as an alternative to the preferred silylation procedure using trimethylsilyldiethylamine. By heating 6-APA with three molar proportions of hexamethyldisilazane at 120° C. for 3 hours followed by filtration and concentration under vacuum, a 64.5% yield of disilylated APA is reported (Example 3 of the patent).

The present invention is an improvement in the prior art processes for preparing aminopenicillins by the silyl route using hexamethyldisilazane as silylating agent. In accordance with said improved processes, one molar proportion of 6-APA is heated with from about 0.6 to about 0.8 molar proportion of hexamethyldisilazane in methylene chloride at reflux for from about 2 to about 4 hours, and then cooling the resulting solution. The reaction mixture is then preferably treated with approximately one molar proportion of a weak base, such as, N,N-dimethylaniline, pyridine, or quinoline, followed by reaction with about one molar proportion of the selected organic acid halide hydrohalide. The silyl group is then removed by solvolysis with water or alcohol to give a solution of the aminopenicillin hydrohalide. The latter can then be isolated as the aminopenicillin, for example, by adjustment to its isoelectric point with alkali. Given hereinbelow is a schematic representation of the reaction procedures:

(a)
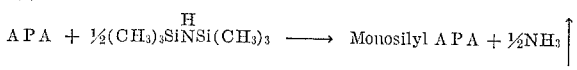

(b)
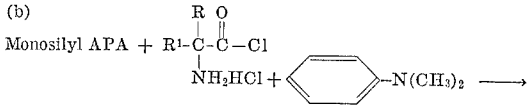

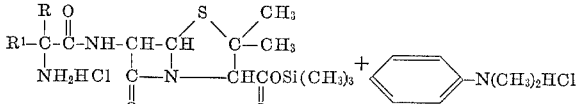

(c)
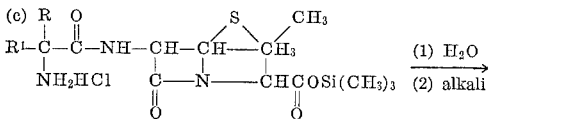

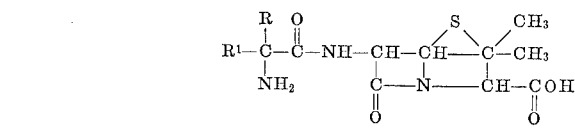

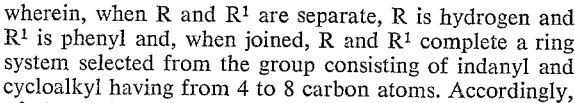

wherein, when R and R¹ are separate, R is hydrogen and R¹ is phenyl and, when joined, R and R¹ complete a ring system selected from the group consisting of indanyl and cycloalkyl having from 4 to 8 carbon atoms. Accordingly, of the various aminopenicillins which may be prepared by the method of the persent invention, there may be noted as merely exemplary, 6-(D-2-aminophenylacetamido)penicillanic acid (ampicillin), 6-(1-aminocyclobutanecarboxamido)penicillanic acid, 6-(1-aminocyclopentanecarboxamino)penicillanic acid, 6-(1-aminocyclohexanecarboxamido)penicillanic acid, 6-(1-aminocycloheptane carboxamido)penicillanic acid, 6-(1-aminocyclooctane carboxamido)penicillanic acid, 6-(1-aminocyclononane carboxamido)penicillanic acid, 6-(1-amino-1-indanecarboxamido)penicillanic acid, 6-(2-amino-2-indanecarboxamido)penicillanic acid, and analogues thereof having noninterfering substituents on the phenyl, cycloalkyl or indanyl rings thereof, such as methyl, ethyl, propyl, methoxy, ethoxy, propoxy, chloro, bromo, fluoro, trihalomethyl, nitro, amino, and the like.

The method of the present invention for preparing aminopenicillins differs from the comparable prior art methods in that methylene chloride is used as a reaction medium, a markedly smaller excess of hexamethyldisilazane is employed, high temperatures are avoided, and distillation of solvents and excess hexamethyldisilazane is unnecessary. The intermediate is monosilylated 6-APA which can be isolated but is preferably acylated without isolation in the presence of a weak base to provide the desired aminopenicillins having recognized potent antibiotic activity. The superiority of methylene chloride as a reaction medium over those recommended in the prior art is shown by the following yields of anhydrous ampicillin obtained in three experiments using 0.8 mole of hexamethyldisilazane per mole of 6-APA:

| Reaction solvent: | Yield of ampicillin, percent |
|---|---|
| Benzene | 24 |
| Chloroform | 60 |
| Methylene chloride | 86 |

The use of a limited excess of hexamethyldisilazane for silylation affords higher yields since the peresence of even a much smaller excess than disclosed in the prior art has been found to interfere in the acylation stage under otherwise optimum conditions.

The following examples are given by way of illustration and are not to be construed as limitations of this invention, many variations of which are possible without departing from the scope and spirit thereof.

EXAMPLE I

Preparation of anhydrous 6-(D-2-aminophenylacetamido)penicillanic acid (ampicillin anhydrous)

In a 1 liter 3-neck flask fitted with stirrer, thermometer, nitrogen inlet, and reflux condenser with drying tube a, mixture of 43.2 g. (0.20 mole) of 6-aminopenicillanic acid, 400 ml. of methylene chloride, and 25.8 g. (0.16 mole) of hexamethyldisilazane was heated at reflux for 3 hours allowing $NH_3$ to escape. After cooling the turbid solution to 15° C. under nitrogen, 29.1 g. (0.24 mole) of N-N-dimethylaniline and 6 ml. of a 3.16 N solution of N,N-dimethylaniline dihydrochloride in methylene chloride were added.

Then, 41.3 g. (0.20 mole) of D (—) phenylglycyl chloride HCl was added portionwise to the reaction mixture at 0±2° C. over 20 minutes. After allowing to stir at 0° C. for 15 minutes and at 10° C. for 15 minutes, the reaction mixture was poured into 1200 ml. of cold water. The resulting solution (pH 1.6) was clarified by filtration and 150 ml. of ethyl acetate was added.

To this mixture at 5–10° C., a solution of β-naphthalene sulfonic acid containing 52 g. (0.25 mole) of active agent was added dropwise while adding dilute sodium hydroxide concurrently to maintain a pH of 1.5–1.7. After stirring for 16 hours, the crystalline product was collected by filtration and washed thoroughly with cold water and finally with ethyl acetate. Drying a sample of the wet filter cake showed the yield of β-naphthalenesulfonic acid salt of ampicillin to be 105 g. or 94% of theory.

The wet filter cake was heated in a mixture of 240 ml. of isopropanol and 19.3 g. (0.19 mole) of triethylamine at 70–75° C. for 15 minutes, and the product was collected by filtration and washed with 85% isopronanol. The yield of dried ampicillin anhydrous amounted to 60.2 g. or 86% overall from 6-APA; iodometric assay, 983 mcg. per mg.

Following the same procedure with chloroform (used by Glombitza) and with benzene (used by U.S. Pat. 3,349,622) as reaction media, the overall yields of ampicillin anhydrous were reduced to 60% and 24% of theory, respectively, as appears in following two examples:

EXAMPLE II

Preparation of ampicillin (anhydrous)

The procedure of Example 1 was repeated substituting alcohol-free chloroform, dried over $P_2O_5$, for methylene chloride as reaction medium. The overall yield of ampicillin anhydrous was 60% of theory based on 6-APA.

EXAMPLE III

Preparation of ampicillin (anhydrous)

The procedure of Example I was repeated except that benzene was used as a reaction medium in place of methylene chloride. After pouring the reaction mixture into water and filtering, the water was separated and combined with two additional water extracts (450 ml.) of the benzene phase prior to precipitation of the naphthalenesulfonic acid salt of ampicillin. The overall yield of ampicillin anhydrous was 16.5 g. or 24% of theory based on 6-APA.

EXAMPLE IV

Preparation of ampicillin trihydrate

In a 1 l. 3-neck flask fitted with stirrer, thermometer, nitrogen inlet, and a reflux condenser with drying tube, a mixture of 43.2 g. of 6-APA, 400 ml. of methylene chloride, and 25.8 g. of commercial grade hexamethyldisilazane was heated at reflux for two hours allowing ammonia to escape. After cooling the slightly turbid solution to 15° C. under dry nitrogen, 29.1 g. (0.24 mole) of N,N-dimethylaniline was added followed by 6 ml. of a 3.16 N solution of dimethylaniline dihydrochloride in methylene chloride.

Then, 41.9 g. (0.20 mole) of D (—) phenylglycyl chloride HCl was added in proportions at 0° C. over 20 minutes. After allowing the mixture to warm slowly to 10° C. and stir at 10° C. for an additional 15 minutes, the mixture was poured into 850 ml. of cold water with stirring. The resulting solution (pH 1.7) was clarified by filtration and adjusted to pH 5.0 with 5 N sodium hydroxide solution.

After stirring at 5–8° C. overnight. the white crystalline ampicillin trihydrate was collected by filtration, washed thoroughly, and dried at 45° C.; yield, 65.3 g. or 81% of theory based on 6-APA; moisture content, 13.3%; iodometric assay, 860 mcg. per mg. (theory, 867).

EXAMPLE V

The procedure of Example IV was repeated except that the amount of hexamethyldisilazane used was 22.6 g. (0.14 mole), the reflux time was 3 hours. The yield of ampicillin trihydrate was 58.0 g. or 72% of theory; moisture content, 13.1%; iodometric assay, 839 mcg. per mg.

EXAMPLE VI

The procedure of Example IV was repeated except that the amount of hexamethyldisilazane used was 32.3 g. (0.20 mole). The yield was 53.6 g. or 66% of theory; bioassay, 850 mcg. per mg.

EXAMPLE VII

Preparation of 6-(1-amino-1-cyclohexanecarboxamido)penicillanic acid

In a 1 l. 3-neck flask fitted with stirrer, thermometer, nitrogen inlet, adn reflux condenser with drying tube, a mixture of 43.2 g. of 6-APA, 400 ml. of dry methylene chloride, and 25.8 g. of hexamethyldisilazane was heated at reflux for two hours. After cooling the solution under nitrogen to 0° C., 16.6 g. (0.21 mole) of pyridine was added.

Then, 41.0 g. (0.207 mole) of 1-amino-1-cyclohexanecarboxylic acid chloride hydrochloride was added portionwise over 15 minutes at 0° C. After stirring at 0° C. and finally at 20° C. for 1½ hours, the reaction mixture was poured into 300 ml. of cold water, clarified by filtration, and adjusted to pH 5.4 by adding dilute sodium hydroxide solution.

After stirring overnight at 20° C., the product was collected by filtration, washed with acetone, and dried at 45° C. The yield of 6-(1-aminocyclohexanecarboxamido) penicillanic acid dihydrate was 63.5 g. or 84% of theory based on 6-APA; moisture content, 9.8%; purity by iodometric assay, 98%.

EXAMPLE VIII

In a 1 l. 3-neck askfl fitted with stirrer, thermometer, nitrogen inlet, and reflux condenser with soda-lime drying tube, 22.6 g. (0.14 mole) of commercial grade hexamethyldisilazane was added to 43.2 g. of 6-APA and 400 ml. of dry methylene chloride, and the mixture was refluxed gently for 3 hours. After cooling the mixture to 15° C. under nitrogen, unreacted 6-APA was removed by filtration under nitrogen; dry weight, 2.5 g.

The clear filtrate was concentrated under vacuum to a colorless oil, which was further concentrated under 1 mm. pressure at 40° C. for 4 hours. The resulting brittle solid weighed 55.1 g. corresponding to 101% of theory for monosilyl APA based on 6-APA consumed. On redissolving this monosilyl APA in methylene chloride and acylating with D (—) phenylglycyl chloride hydrochloride as described in Example I, Ampicillin anhydrous was obtained in high yields.

EXAMPLE IX

The procedure of Example VIII was repeated except that the amount of hexamethyldisilazane employed was 19.4 g. (0.12 mole). The yield of solid concentrate corresponded to 101% of theory for monosilyl APA based on the 6-APA consumed, and the proportion of disilylated APA was shown by gas chromatographic methods to be less than 1%.

EXAMPLE X

The effect of increasing the excess of hexamethyldisilazane (HMDS) in the silylation stage on the yield of ampicillin trihydrate in the acylation stage was demonstrated by following the general procedure of Example IV in a series of four separate runs. The effect is illustrated in the following TableA:

TABLE A

| Molar ratio HMDS:APA: | Overall yield ampicillin trihydrate, percent |
|---|---|
| 0.7 | 72 |
| 0.8 | 81 |
| 1.0 | 66 |
| 2.0 | <5 |

EXAMPLE XI

Following the procedure of Example VII, monosilyl derivatives of other penicillins are prepared, and from them the corresponding penicillins by substituting for 1-amino-1-cyclohexanecarboxylic acid chloride hydrochloride, equivalent amounts of the acylating agents listed below.

| Acylating agent | Penicillin |
|---|---|
| 2-amino-2-carboxyindane chloride hydrochloride. | 6-(2-amino-2-indanecarboxamido) penicillanic acid. |
| 1-amino-1-carboxyindane chloride hydrochloride. | 6-(1-amino-1-indanecarboxamido) penicillanic acid. |
| 1-aminocyclopentanecarboxylic acid chloride hydrochloride. | 6-(1-aminocyclopentanecarboxyamido) penicillanic acid. |
| 1-amino-1-cyclohexanecarboxylic acid bromide hydrobromide. | 6-(1-aminocyclohexanecarboxamido) penicillanic acid. |

What is claimed is:

1. A method of preparing a monosilylated, hydrohalide salt of a penicillin of the group having the following formula:

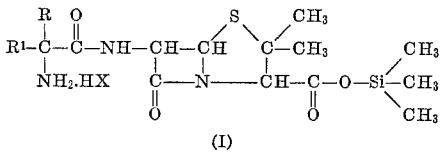

(I)

wherein, when R and $R^1$ are separate, R is hydrogen and $R^1$ is phenyl; when R and $R^1$ are joined, they complete a ring system selected from the group consisting of indane and cycloalkyl having from four to eight carbon atoms; and X is selected from the group consisting of chloro and bromo; which method comprises:

(1) preparing a mixture containing one molar proportion of 6-aminopenicillanic acid and from about 0.6 to about 0.8 molar proportion of hexamethyldisilazane, in methylene chloride;
(2) heating said mixture at reflux to form mono(trimethylsilyl)-6-aminopenicillanic acid and ammonia;
(3) adding to the resulting mixture containing the mono(trimethylsilyl)-6-aminopenicillanic acid, about one molar proportion of a weak amine and about one molar proportion of an oragnic acid halide hydrohalide of the group having the formula:

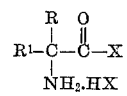

wherein R, $R^1$ and X have the same meaning as defined above.

2. A method of preparing a monosilylated, hydrohalide salt of a penicillin, as defined in claim 1, wherein: the the weak amine is selected from the group consisting of N,N-dimethylaniline, quinoline and pyridine.

3. A method of preparing a monosilylated, hydrohalide salt of a penicillin, as defined in claim 2, wherein: the organic acid halide hydrohalide is selected from the group consisting of D(—) phenylglycyl chloride hydrochloride, 1-amino-1-cyclohexanecarboxylic acid chloride hydrochloride, 2-amino-2-carboxyindane chloride hydrochloride and 1-amino-1-carboxyindane chloride hydrochloride.

References Cited

UNITED STATES PATENTS 3,249,622 5/1966 Herrling et al. _____ 260—239.1

NICHOLAS S. RIZZO, Primary Examiner